(12) United States Patent
Zhang et al.

(10) Patent No.: US 10,846,398 B2
(45) Date of Patent: Nov. 24, 2020

(54) METHOD, MEANS, SYSTEM, PROCESSOR, AND MEMORY FOR INTERCEPTING MALICIOUS WEBSITES

(71) Applicant: Alibaba Group Holding Limited, George Town (KY)

(72) Inventors: Meichao Zhang, Hangzhou (CN); Zhijian Deng, Hangzhou (CN)

(73) Assignee: Alibaba Group Holding Limited

( * ) Notice: Subject to any disclaimer, the term of this patent is extended or adjusted under 35 U.S.C. 154(b) by 283 days.

(21) Appl. No.: 15/950,671

(22) Filed: Apr. 11, 2018

(65) Prior Publication Data

US 2018/0300475 A1 Oct. 18, 2018

(30) Foreign Application Priority Data

Apr. 14, 2017 (CN) .......................... 2017 1 0244547

(51) Int. Cl.
*G06F 21/53* (2013.01)
*H04L 29/06* (2006.01)
*H04L 29/12* (2006.01)
*H04L 29/14* (2006.01)
*H04L 29/08* (2006.01)

(52) U.S. Cl.
CPC .......... *G06F 21/53* (2013.01); *H04L 61/1511* (2013.01); *H04L 63/0236* (2013.01); *H04L 63/0272* (2013.01); *H04L 63/0281* (2013.01); *H04L 69/40* (2013.01); *G06F 2221/2119* (2013.01); *H04L 67/02* (2013.01)

(58) Field of Classification Search
CPC ............. G06F 21/53; G06F 2221/2119; H04L 61/1511; H04L 63/0236; H04L 63/0272; H04L 63/0282; H04L 67/02; H04L 69/40

USPC .......................................................... 726/22
See application file for complete search history.

(56) References Cited

U.S. PATENT DOCUMENTS

| | | | |
|---|---|---|---|
| 5,706,507 A | 1/1998 | Schloss | |
| 6,564,327 B1 | 5/2003 | Klensin | |
| 7,272,625 B1 * | 9/2007 | Hannel | H04L 63/0218 709/200 |

(Continued)

FOREIGN PATENT DOCUMENTS

| | | |
|---|---|---|
| CN | 102200980 A | 9/2011 |
| CN | 102402620 A | 4/2012 |

(Continued)

OTHER PUBLICATIONS

NPL Search Results (Year: 2020).*

*Primary Examiner* — Syed A Zaidi
(74) *Attorney, Agent, or Firm* — Van Pelt, Yi & James LLP

(57) ABSTRACT

Embodiments of the present application relate to a method, device, and system for intercepting traffic to malicious websites. The method includes obtaining, by one or more processors, a network request from a terminal, obtaining, by one or more processors, domain information from the network request, determining, by one or more processors, whether the domain information corresponds to an access-prohibited website domain, and communicating, by one or more processors, a web page response to terminal, wherein the web page response is based at least in part on the determining whether the domain information corresponds to an access-prohibited website domain.

17 Claims, 8 Drawing Sheets

(56) References Cited

U.S. PATENT DOCUMENTS

| | | | |
|---|---|---|---|
| 7,516,219 B2 * | 4/2009 | Moghaddam | H04L 63/0245 709/225 |
| 7,725,602 B2 * | 5/2010 | Liu | H04L 29/12066 709/217 |
| 7,865,953 B1 | 1/2011 | Hsieh | |
| 8,069,472 B2 * | 11/2011 | Morris | G06F 21/552 726/23 |
| 8,160,580 B2 * | 4/2012 | Nasielski | H04W 8/02 455/433 |
| 8,161,535 B2 * | 4/2012 | Huang | H04L 41/00 370/351 |
| 8,201,238 B1 * | 6/2012 | Wu | H04L 63/20 726/15 |
| 8,676,989 B2 * | 3/2014 | Treuhaft | H04L 29/12811 709/227 |
| 9,571,452 B2 * | 2/2017 | Salcedo | H04L 63/0236 |
| 9,742,723 B2 * | 8/2017 | Orentas | H04L 61/1511 |
| 9,762,543 B2 * | 9/2017 | Xie | H04L 63/0236 |
| 9,973,587 B2 | 5/2018 | Gao | |
| 2009/0077651 A1 * | 3/2009 | Poeluev | H04L 61/1511 726/15 |
| 2010/0024033 A1 | 1/2010 | Kang | |
| 2010/0199345 A1 | 8/2010 | Nadir | |
| 2012/0324094 A1 | 12/2012 | Wyatt | |
| 2014/0096246 A1 | 4/2014 | Morrissey | |
| 2014/0181915 A1 * | 6/2014 | Su | H04L 67/18 726/4 |
| 2015/0281262 A1 | 10/2015 | Cai et al. | |
| 2016/0197924 A1 | 7/2016 | Lapidous et al. | |
| 2017/0279767 A1 * | 9/2017 | Fork | H04L 67/10 |
| 2018/0248898 A1 | 8/2018 | Liu | |

FOREIGN PATENT DOCUMENTS

| | | |
|---|---|---|
| CN | 106453216 | 2/2017 |
| WO | WO-2014032619 A1 | 3/2014 |

* cited by examiner

US 10,846,398 B2

METHOD, MEANS, SYSTEM, PROCESSOR, AND MEMORY FOR INTERCEPTING MALICIOUS WEBSITES

CROSS REFERENCE TO OTHER APPLICATIONS

This application claims priority to People's Republic of China Patent Application No. 201710244547.X entitled METHOD, MEANS, SYSTEM, PROCESSOR, AND MEMORY FOR INTERCEPTING MALICIOUS WEB SITES filed Apr. 14, 2017, which is incorporated herein by reference for all purposes.

FIELD OF THE INVENTION

The present application relates to a field of Internet technology applications. In particular, the present application relates to a method, device, system, processor, and memory for intercepting malicious websites.

BACKGROUND OF THE INVENTION

The global malicious website interception scheme on Apple iOS systems generally involves having the user connect to a virtual private network (VPN). In this way, all application (app) requests go through the VPN server. At the same time, malicious website detection and interception capabilities have been deployed on the VPN server.

While using a terminal (e.g., an iOS device), a user may inadvertently access malicious websites, such as phishing sites, pornographic sites, and gambling sites. The user generally accesses the malicious websites in the following ways:

1. Content of a received text message includes a malicious website link and the user selects the malicious website link. The currently prevalent pseudo base station fraud is generally of this sort.
2. Chat content received through an instant messaging tool includes a malicious website link and the user selects the malicious website link.
3. Content of a received email includes a malicious website link and the user selects the malicious web site link.

Some operating systems, such Apple operating systems (e.g., iOS) are relatively closed. Applications running on operating systems that are closed can generally only access the data within the application's own sandbox, and each application is responsible for the application's own security. For example, the WeChat application can only intercept Uniform Resource Locator (URL) requests transmitted through the WeChat platform, and the Webo application can only intercept URL requests transmitted through the Webo application. Therefore, applications (e.g., the Webo application) running on operating systems that are closed generally cannot provide users with global interception protection from malicious websites.

In order to achieve the objective of global interception of malicious websites on operations systems that are closed (e.g., iOS systems), the existing schemes can have the user connect to a VPN, direct all application traffic through the VPN server, and then conduct detections and interceptions on the VPN server. The VPN server can serve as an intermediary of all traffic or communications of the application can accordingly filter malicious traffic. Using the VPN server to detect and intercept malicious traffic requires the terminal running to the application to remain connected to the VPN. Requiring the terminal to remain connected to the VPN can be undesirable for several reasons:

(1) Poor user experience: The terminal is required to remain connected to the VPN server. Normal Internet traffic needs to be forwarded through the VPN server, resulting in low network speeds and slow network request responses.
(2) High VPN server cost: The VPN server will bear very large loads; both traffic expenses and equipment expenses are very high.

Therefore, the reason that the current scheme requires connection to the VPN before it can perform global malicious website interception is that the right to modify iOS system network settings can be obtained only when the terminal is connected to a VPN. The network settings cannot be changed without a connection to the VPN. Directing all application traffic to a server having security monitoring functions is generally difficult.

It would be desirable to have a solution that addresses the problem described above, namely the large expenditure of system resources resulting from the requirement in the prior art that all malicious website interception be completed by a VPN.

BRIEF DESCRIPTION OF THE DRAWINGS

Various embodiments of the invention are disclosed in the following detailed description and the accompanying drawings.

The drawings described here are intended to further the understanding of the present application and form a part of the present application. The illustrative embodiments of the present application and the descriptions thereof are intended to explain the present application and do not constitute inappropriate limitation of the present application. Among the drawings.

DETAILED DESCRIPTION

Figure 1:
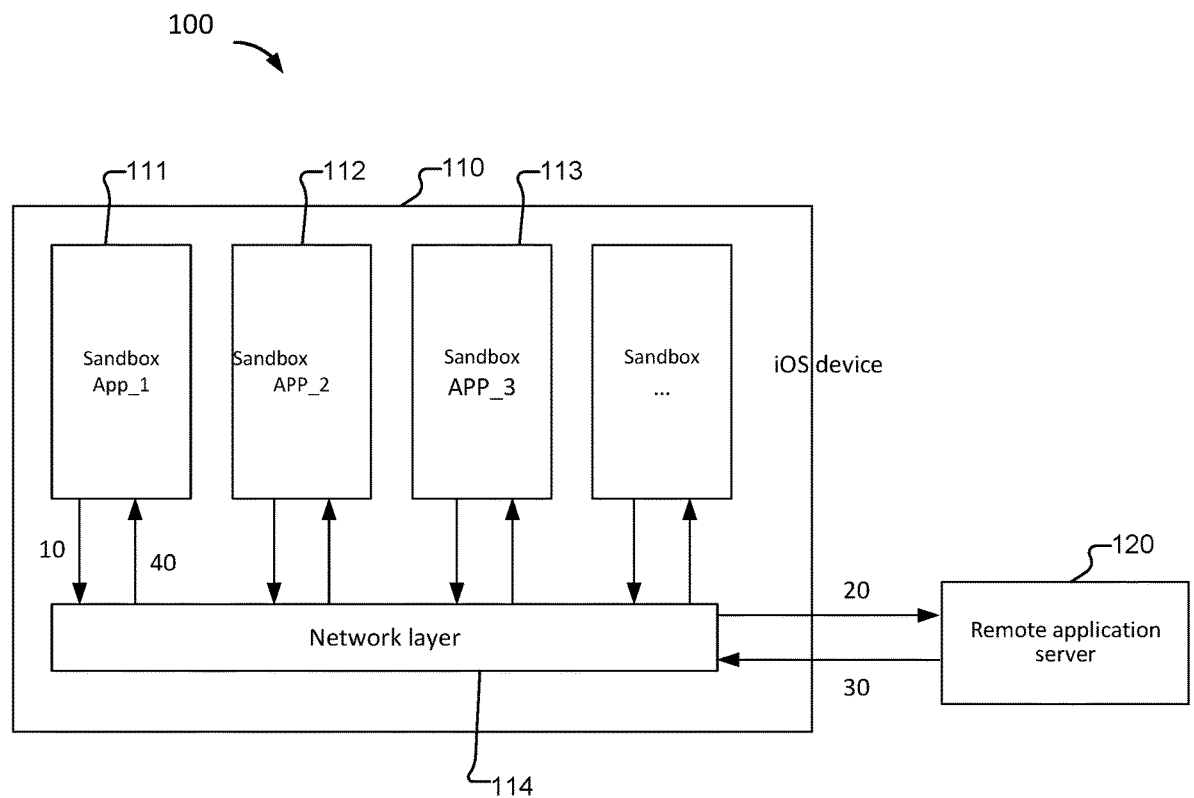
FIG. 1 is a diagram of the process according to which an application sends a network request according to related art.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In order to give persons skilled in the art a better understanding of the present application, technical schemes in embodiments of the present application are described clearly and completely in light of the drawings of the embodiments of the present application. Obviously, the embodiments described are merely some of the embodiments of the present application and are not all the embodiments. So long as no additional creative effort is expended, all other embodiments that are obtained by persons with ordinary skill in the art on the basis of embodiments in the present application shall fall within the scope of protection of the present application.

Please understand that the terms "first," "second," etc. in the description, claims, and drawings of the present application are used to differentiate similar objects and are not necessarily used to describe their particular sequence or order. It should be understood that data used in this way may be switched as appropriate. Thus, embodiments of the present application described herein can be implemented in sequences other than those shown or described herein. In addition, the terms "comprise" and "have" and variations thereof are meant to be non-exclusive. For example, a process, method, system, product, or device containing a series of steps or units need not be limited to those steps or units that are clearly listed, but may comprise other steps or units not clearly listed or intrinsic to these processes, methods, products, or devices.

Definitions

Terminal: As used herein, a terminal generally refers to a device comprising one or more processors. A terminal can be a device used (e.g., by a user) within a network system and used to communicate with one or more servers. According to various embodiments of the present disclosure, a terminal includes components that support communication functionality. For example, a terminal can be a smart phone, a server, a machine of shared power banks, an information centers (such as one or more services providing information such as traffic or weather, etc.) a tablet device, a mobile phone, a video phone, an e-book reader, a desktop computer, a laptop computer, a netbook computer, a personal computer, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic accessory, an electronic tattoo, or a smart watch), a kiosk such as a vending machine, a smart home appliance, vehicle-mounted mobile stations, or the like. A terminal can run various operating systems.

Smart Terminal: A "smart terminal" is a terminal device having multimedia functions. A smart terminal supports audio, video, data, and other such functions. The smart terminal can have a touchscreen. The smart terminal can correspond to a smart mobile device such as a smart phone, a tablet computer, or a smart wearable device, or a smart television, personal computer, or other such device with a touchscreen. Various operating systems such as Android, iOS, YunOS, and tvOS can be implemented on the smart terminal. Various embodiments discussed herein are in the context of the example of a television device using tvOS; however, other types of terminals or operating systems can be used. A smart terminal can be connected to one or more networks such as the Internet, a WiFi network, a Local Area Network (LAN), a Wide Area Network (WAN), a telecommunications network, etc.

Apple terminal: A terminal that runs iOS or macOS; includes, but is not limited to, iPhone, iPad, iPod, and MacBook.

Global interception: The ability to intercept all requests such as Uniform Resource Locator (URL) requests sent by applications on operating systems, including operating systems that are closed. Global interception can be differentiated from application-based interception (e.g., the WeChat application only being able to monitor URL requests transmitted through WeChat, the Webo application only being able to monitor URL requests transmitted through Webo).

Malicious websites: Specifically refers to phishing websites, gambling websites, pornographic websites, illegal websites, etc.

DNS: Domain name system (DNS) is an Internet service. As a distributed database that maps domain names and IP addresses to each other, the DNS can make Internet access more convenient. Before issuing each domain name-based network request, a mobile terminal generally first to converts the domain name into an IP address via the DNS. After the mobile terminal converts the domain name into an IP address, the mobile terminal can send the request to a server corresponding to the IP address.

Pseudo base station: is a malicious terminal that is also sometimes referred to as a fake base station. A pseudo base station is a form of illegal wireless communication equipment that takes advantage of Global System for Mobile Communications (GSM) one-way authentication flaws. A pseudo base station primarily comprises a host computer and a notebook computer. A pseudo base station can search for and acquire SIM card information within a certain radius and, posing as any mobile phone number, forcefully send fraudulent, promotional, or other junk messages to a user's mobile phone. A pseudo base station generally transmits from an automobile or other relatively hidden place from which the pseudo base station is located. When a pseudo base station is operating, the user's mobile phone signal is forced to connect to the equipment and cannot connect to a public telecommunication network, with the result that normal phone use by the user is affected.

VPN on Demand: This function may specify that a terminal running a particular operating system (e.g., an Apple system) automatically connect to or automatically disconnect from a VPN under certain conditions. Examples of conditions under which the terminal is to automatically connect to/disconnect from the VPN include:

Automatically activate the VPN (e.g., connect to the VPN) when a certain domain name is accessed.

Automatically activate the VPN (e.g., connect to the VPN) when a designated network request fails.

In response to a certain domain name being accessed, the domain name is analyzed using a designated DNS server according to a setting. If the analysis of the domain name fails, then activate the VPN (e.g., connect to the VPN).

According to related art, in order to reduce the risks of malicious third parties in connection with network requests sent by an application: a terminal is required needs to remain connected to a VPN that filters potentially malicious traffic. Because the related art requires the terminal to remain connected to the VPN, the user experience is poor, and server costs are high.

FIG. 1 is a diagram of the process according to which an application sends a network request according to related art.

Referring to FIG. 1, process 100 includes a terminal 110 and a remote application server 120 communicating. Terminal 110 runs an operating system that is a closed system and includes one or more applications. For example, terminal 110 includes a first application (App_1), a second application (App_2), and/or a third application (App_3). In connection with each of the one or more applications, terminal 110 invokes a sandbox. For example, terminal 110 invokes sandbox 111 for the first application, sandbox 112 for the second application, and a sandbox 113 for the third application. The one or more applications can execute within a corresponding sandbox and can communicate with one or more networks via a system network layer 114 of the terminal 110. A sandbox can be an environment that isolates code running thereon from other code. For example, in a software development context, a sandbox can be a testing environment that isolates untested code changes and outright experimentation from the production environment or repository, in the context of software development including Web development and revision control. Other contexts for the use of a sandbox are possible.

Process 100 describes interactions between the first application and remote application server 120.

At 10, the first application 111 calls an interface in the system network layer 114 to send a network request.

At 20, the system network layer 114 determines the application from which the network request was obtained, and forwards the network request to remote application server 120.

At 30, in response to receiving the network request, remote application server 120 processes the network request, and communicates a corresponding request result back to the system network layer 114 of terminal 110.

At 40, in response to receiving the request result from the remote application server 120, the system network layer 114 determines that the request result corresponds to the request sent by the first application, and communicates the request results to the first application.

As illustrated by process 100, network requests from all applications of a terminal have to be distributed through the system network layer of the terminal. The system network layer ensures that network requests are done in an orderly manner. Requests issued by App_1 can be sent back to App_1 only, and other apps cannot monitor App_1 requests. For example, normally, system applications on terminals of some operating systems (e.g., terminals running an Apple operating system) cannot monitor requests throughout the system network layer. Accordingly, system applications are unable to carry out global interception of malicious websites.

Various embodiments provide a system and method for intercepting malicious websites.

Figure 2:
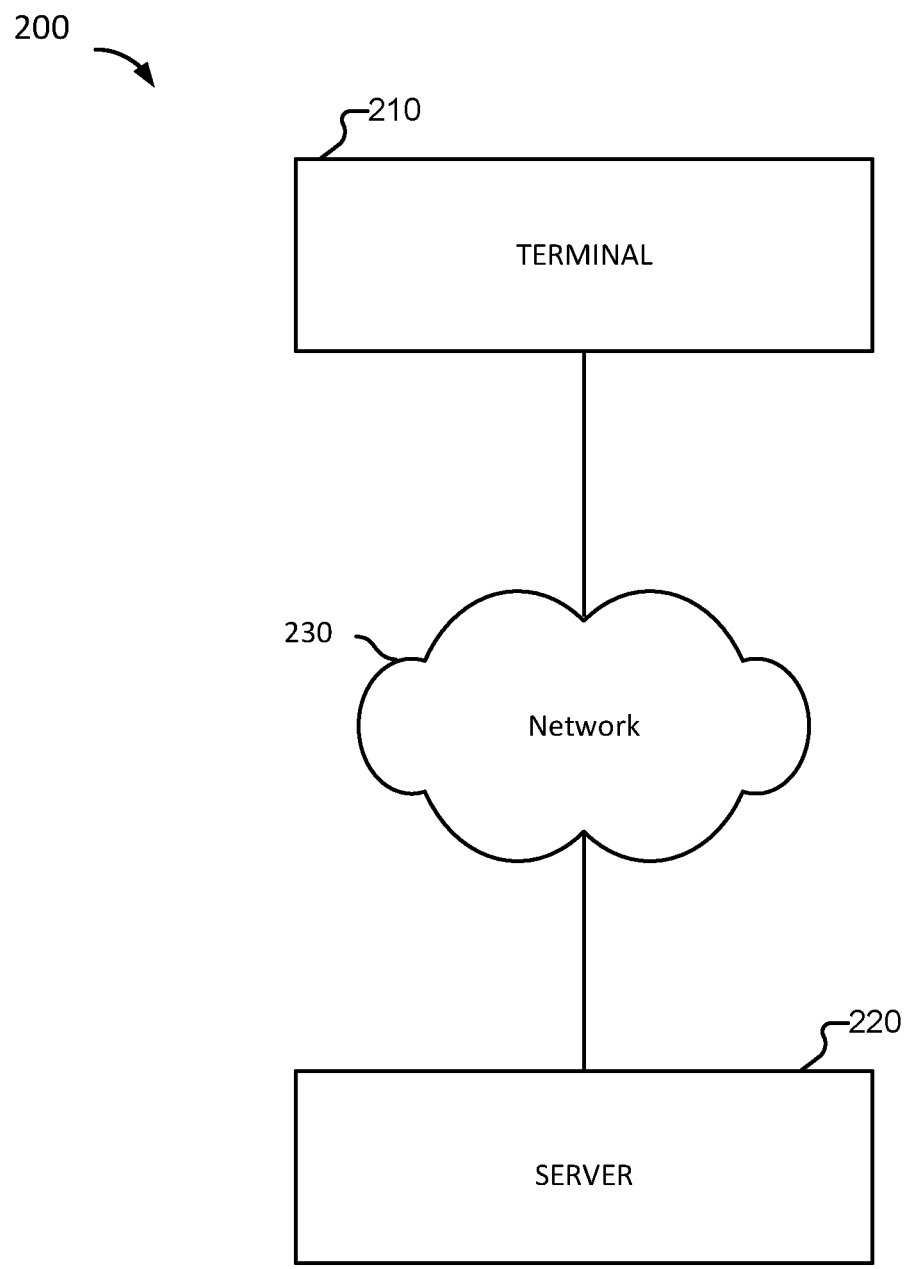
FIG. 2 is a diagram of a system for intercepting malicious websites according to various embodiments of the present application.

FIG. 2 is a diagram of a system for intercepting malicious websites according to various embodiments of the present application.

Referring to FIG. 2, system 200 for intercepting malicious websites is provided. System 200 can implement at least part of process 500 of FIG. 5, process 600 of FIG. 6, and/or process 700 of FIG. 7. System 200 can implement computer system 800 of FIG. 8. In some embodiments, system 200 is implemented in connection with system 300 of FIG. 3 and/or system 400 of FIG. 4.

System 200 includes terminal 210 and server 220. System 200 can also comprise one or more networks 230 over which terminal 210 and server 220 communicate. In some embodiments, server 220 corresponds to a plurality of servers. In some embodiments, server 220 is a Domain Name System (DNS) server.

Terminal 210 sends network requests to server 210. A network request comprises domain information. The domain information can comprise domain name information. In some embodiments, the domain name information comprises information associated with a domain name. According to various embodiments, as used herein, domain information can be used in place for domain name information. Server 220 obtains network requests from one or more terminals (e.g., connected to a network). In response to receiving a network request, server 210 analyzes the network request and obtains the domain information in the network request. The server 220 determines whether the domain name information corresponds to an access-prohibited website domain name information. For example, the server can query a mapping of domain name information to access-prohibited website domains. The mapping of domain name information to access-prohibited website domains can indicate access restriction information (e.g., whether access is prohibited) for corresponding domains associated with the domain name information. In some embodiments, the mapping of domain name information to access-prohibited web site domains is a black-list or a white list of domains. The determining of whether the domain name information corresponds to an access-prohibited website domain name information can include the server 220 searching the mapping of domain name information to access-prohibited website domains, and determining whether the domain name information corresponds to an access-prohibited website domain name information according to a result of the searching of the mapping of domain name information to access-prohibited website domains. As an example, if the domain name information is the same as the pre-saved access-prohibited website domain name information (e.g., if the server 220 finds pre-saved access-prohibited website domain name information corresponding to the domain name information obtained from the network request), the server 220 communicates to the terminal 210 a warning page IP address (e.g., alerting a user of terminal 210 of the potential that the requested domain is not secure). As another example, if the domain name information is different from the pre-saved access-prohibited website domain name information (e.g., if the server 220 does not find pre-saved access-prohibited website domain name information corresponding to the domain name information obtained from the network request), the server 220 communicates to the terminal 210 the web page address corresponding to the domain name information.

Various embodiments provide a method and system for intercepting malicious websites in connection with detecting and intercepting malicious websites. According to various embodiments, terminal 210 is compatible with iOS and can connect to a network.

In some embodiments, terminal 210 presets VPN On Demand conditions so that server will 220 analyze all domain names accessed by the user through terminal 210. For example, the terminal can have preset settings, configurations, or the like that specify that a terminal running a particular operating system (e.g., an iOS, other Apple operating system, etc.) automatically connects to, or automatically disconnects from, a VPN under certain conditions (e.g., the VPN On Demand conditions). As an example, the VPN On Demand conditions can include specifying to connect to/disconnect from a VPN when one or more predefined domains are accessed or visited (e.g., via a browser or other application), or in response to determining that the terminal is attempting to access or visit the one or more predefined domains. As an example, the VPN On Demand conditions include using specified DNS servers when one or more predefined domains are accessed or visited (or in response to determining that the terminal is attempting to access or visit the one or more predefined domains), and connect to/disconnect from the VPN when DNS request fails.

The VPN On Demand conditions are configurable. For example, a user of terminal 210 can configure the VPN On Demand conditions, an administrator associated with the network or the server 220 can configure the VPN On Demand conditions, etc. Server 220 analyzes the domain names accessed by terminal 210 and ensures requests are returned successfully. In some embodiments, server 220 analyzes all domain names accessed by terminal 210. In this way, all domain name analysis is completed through server 220. Moreover, because server 24 conducts the analysis, server 220 will not fail to return a request. According to various embodiments, a DNS setting is not required to be changed at terminal 210 side. All DNS requests from terminal 210 are directed to the DNS server (e.g., server 220), and the DNS server 220 (e.g., server 220) that performs domain name detection and interception. In some embodiments, the remote DNS server only handle domain requests associated with a malicious domain, and for other sites (e.g., non-malicious domains, or good domains), DNS requests are handled normally.

According to various embodiments, all network requests sent by terminal 210 are analyzed by server 220. As an example, server 220 can determine whether a domain name corresponding to a network request is malicious based on mappings of domain names to access-prohibited website domains or mappings of domain names to domain name access information that otherwise indicates access restriction information (e.g., a white list, a black list, etc.). As an example, domain name information corresponding to the domain name is communicated to the server 220, and server 220 uses the domain name information in the network request as a basis to determine whether the domain name information is consistent with (e.g., matches) pre-saved access-prohibited website domain name information. If the domain name information is consistent with the pre-saved access-prohibited website domain name information, server 220 sends to the terminal a warning page IP address or another alert indicating of the potential maliciousness of the requested domain. The server 220 can provide the terminal 210 with a link (or other mechanism) to allow the terminal 210 to visit the requested domain despite the warning of the potential maliciousness of the requested domain. If the domain name information is not consistent with (e.g., is different from) the pre-saved access-prohibited website domain name information, server 220 sends to terminal 220 the web page address corresponding to the domain name information. For example, the server 220 can be an "Alert server", and in response to determining that the requested domain is malicious, the warning page (e.g., hosted on the "Alert server") to user. The warning page can suggest that the user not to continue visit this page (e.g., corresponding to the malicious domain), however, if user insists on visiting the page (e.g., corresponding to the malicious domain), the user can click the button on warning page to visit original malicious page.

According to various embodiments, access-prohibited websites include: phishing websites, pornographic websites, gambling websites, websites that spread rumors, subvert the state, or affect social stability, and other websites that violate applicable laws and regulations (e.g., U.S. laws, Chinese law, etc.).

In some embodiments, directly acquiring a malicious website by omitting VPN signaling requests is achieved through a terminal and a server, wherein the terminal sends a network request that comprises: domain name information, and the server (e.g., connected to the terminal via one or more networks) receives the network request. In response to receiving the network request, the server can analyze the network request, obtain the domain name information from the network request, determine whether the domain name information is consistent with (e.g., matches) pre-saved access-prohibited website domain name information, provide the terminal with access to the requested domain based on the determination of whether the domain name information is consistent with (e.g., matches) pre-saved access-prohibited website domain name information. In some embodiments, if the domain name information is consistent with the pre-saved access-prohibited website domain name information, the server communicates to the terminal a warning page IP address or another alert indicating the potential that the requested domain corresponds to, or is otherwise associated with, a malicious party. In some embodiments, if the domain name information is not consistent with the pre-saved access-prohibited website domain name information, the server sends to the terminal the web page address corresponding to the domain name information. According to various embodiments, the technical benefit of reducing system resource consumption is achieved, and thus the technical problem of the large expenditure of system resources resulting from the requirement of systems in the related art that all malicious website interception be completed by a VPN is solved.

Figure 3:
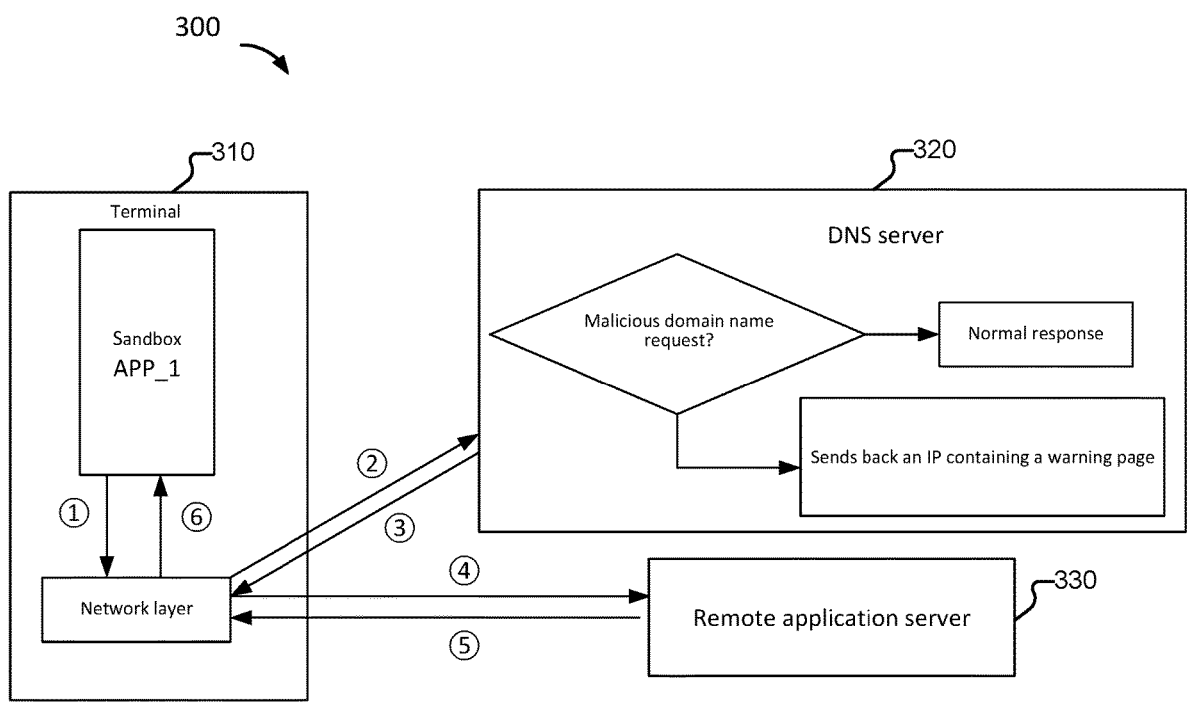
FIG. 3 is a diagram of a system for intercepting malicious websites according to various embodiments of the present application.

FIG. 3 is a diagram of a system for intercepting malicious websites according to various embodiments of the present application.

Referring to FIG. 3, system 300 for intercepting malicious websites is provided. System 300 can implement at least part of process 500 of FIG. 5, process 600 of FIG. 6, and/or process 700 of FIG. 7. System 200 can implement computer system 800 of FIG. 8. In some embodiments, system 300 is implemented in connection with system 200 of FIG. 2, and/or system 400 of FIG. 4.

System 300 includes terminal 310 and one or more servers. For example, system 300 includes DNS server 320, and remote application server 330. System 300 can also comprise one or more networks (not shown) over which terminal 310, DNS server 320, and/or remote application server 330 communicate. In some embodiments, DNS server 320 corresponds to a plurality of servers. In some embodiments, remote application server 330 corresponds to a plurality of servers.

In some embodiments, a start condition for virtual private network connect-on-demand is configured. The start condition for virtual private network connect-on demand can correspond to one or more conditions that satisfaction of which causes the terminal to access a website via a virtual private network. In some embodiments, the start condition for virtual private network connect-on-demand comprises one or more of: (i) starting the virtual private network in response to at least one preset domain name being accessed (or requested), (ii) starting the virtual private network in response to the network (e.g., the network to which the terminal is connected) switching to a preset WiFi network; (iii) starting the virtual private network in response to the network (e.g., the network to which the terminal is connected) switching to a mobile network; (iv) starting the virtual private network in response to a preset network request failing; (v) starting the virtual private network in response to, upon at least one preset domain name being accessed (or requested), a designated server is used to perform analysis of the requested domain and the analysis of the requested domain fails. In some embodiments, the start condition for virtual private network connect-on-demand is configurable by terminal 310. The start condition for virtual private network connect-on-demand can be configured according to user preferences, user settings, administrator settings, etc.

According to various embodiments, connecting to a virtual private network in connection with an access of a website, network, network resource, etc. based on whether a start condition for virtual private network connect-on-demand is satisfied saves resources in contrast to the related art according to which a VPN is continually (e.g., always) used in connection with the access of a website, network, network resource.

In order to avoid wasting terminal system resources as a result of terminal 310 continually accessing the VPN each time terminal 310 accesses a website, terminal 310 configures the condition for starting virtual private network connect-on-demand. The start condition corresponds to a condition the satisfaction of which will invoke connection to a virtual private network. The start condition for virtual private network connect-on-demand comprises one or more of: (i) starting the virtual private network in response to at least one preset domain name being accessed (or requested), (ii) starting the virtual private network in response to the network (e.g., the network to which the terminal is connected) switching to a preset WiFi network; (iii) starting the virtual private network in response to the network (e.g., the network to which the terminal is connected) switching to a mobile network; (iv) starting the virtual private network in response to a preset network request failing; (v) starting the virtual private network in response to, upon at least one preset domain name being accessed (or requested), a designated server is used to perform analysis of the requested domain and the analysis of the requested domain fails.

According to various embodiments, terminal 310 configures the start condition for virtual private network connect-on-demand. As an example, configuring start condition for virtual private network connect-on-demand comprises: downloading a protection application, and obtaining a configuration for VPN connect-on-demand of the protection application. Terminal 310 can modify terminal settings of terminal 310 based at least in part on configuration for VPN connect-on-demand of the protection application. For example, terminal 310 modifies DNS settings comprised in the terminal settings according to the configuration for VPN connect-on-demand of the protection application. In some embodiments, if the protection application is turned off (including the protection application being terminated or exited from background running), terminal 310 (e.g., the terminal system side) still is able, in accordance with the modified DNS settings, to detect and intercept network access requests issued by each application running of terminal 310. In some embodiments, the DNS settings of terminal 310 are modified in response to execution of the protection app, or selection of a link. As an example, the DNS settings of terminal 310 are modified by a script or process running on terminal 310. Terminal 310 can obtain DNS settings to which the DNS settings of terminal 310 are to match from an application, a link, a website, a token, a Quick Response (QR) code, etc. In response to obtaining the DNS settings to which the DNS settings of terminal 310 are to match, terminal 310 modifies the DNS settings of terminal 310 to the obtained DNS settings.

In some embodiments, the domain name information comprises a domain name.

In some embodiments, the detection and interception of malicious websites in a system for intercepting malicious websites are performed using the domain names provided as feedback by terminal 310.

In some embodiments, the detection and interception of malicious websites in a system for intercepting malicious websites are performed by DNS server 320 based on a requested domain received from the terminal 310. For example, if user is visiting a malicious site, DNS server 320 will not return the malicious IP, DNS server 320 will return an IP of warning page, so the user (e.g., of terminal 310) will see a warning page. If the user is visiting a good site (e.g., a site note corresponding to a malicious domain), DNS server 320 will return the original IP of the good site, so user can visit the good site normally.

In some embodiments, system 300 comprises Domain Name System (DNS) server 320. DNS server 320 is connected to terminal 310. Terminal 310 communicates a network request to DNS server 320. DNS server 320 receives a network request sent by terminal 310. The network comprises a domain name. For example, the domain name corresponds to a domain for which terminal 310 is requesting access (or redirection). In response to receiving the network request, DNS server 320 compares the domain name included in the network request to pre-saved access-prohibited website domain names. In some embodiments, if the domain name information (e.g., the domain name) is consistent with (e.g., matching, the same as, etc.) the pre-saved access-prohibited website domain name information, the server communicates to the terminal a warning page IP address or another alert indicating the potential that the requested domain corresponds to, or is otherwise associated with, a malicious party. In some embodiments, if the domain name information is not consistent with the pre-saved access-prohibited website domain name information, the server sends to the terminal the web page address corresponding to the domain name information.

In some embodiments, system 300 includes remote application server 330. Remote application server 330 is connected to terminal 310 via one or more networks. Terminal 310 can communicate a web page request to remote application server 330. The web page request can comprise web page address for which terminal 310 is requesting access. Remote application server 330 can obtain (e.g., receive) the web page request. In response to receiving the web page request, remote application server 330 communicates to terminal 310 a web page result corresponding to the web page request. As an example, the web page result corresponds to web page information (e.g., information from which terminal 310 can generate the web page). Remote application server 330 can determine the web page result corresponding to the web page request based at least in part on the web page request.

In some embodiments, the web page address comprises: an Internet Protocol (IP) address.

In some embodiments, system 300 comprises DNS server 320 and remote application server 330. In connection with implementing detection and interception of malicious websites, DNS server 320 determines whether the domain name comprised in the network request sent by terminal 310 is consistent with a pre-saved access-prohibited website domain name. In some embodiments, if the domain name information is consistent with the pre-saved access-prohibited website domain name information, DNS server 320 communicates to the terminal a warning page IP address or another alert indicating the potential that the requested domain corresponds to, or is otherwise associated with, a malicious party. In some embodiments, if the domain name information is not consistent with the pre-saved access-prohibited website domain name information, DNS server 320 sends to the terminal the web page address corresponding to the domain name information. The web page address corresponding to the domain name information can comprise an IP address. In response to receiving the web page address, terminal 310 can generate a web page request. For example, terminal 310 generates the web page request based at least in part on the web page address. Terminal 310 communicates a web page request to the remote application server 330. In response to receiving the web page request, remote application server 330 can generate a web page result corresponding to the web page request. Remote application server 330 generates the web page result based at least in part on the web page request. In addition, in response to receiving the web page request, remote application server 330 communicates the web page result corresponding to the web page request to terminal 310.

At step 1 of FIG. 3, an application running on terminal 310 generates a network request and communicates the network request to a network layer of terminal 310. At step 2 of FIG. 3, in response to receiving the network request, the network layer of terminal 310 communicates the network request to DNS server 320. At step 3 of FIG. 3, DNS server 320 determines whether a domain corresponding to the network request is at least potentially malicious. DNS server 320 generates a response to the network request based at least in part on the determining of whether a domain corresponding to the network request is at least potentially malicious. In some embodiments, if the domain name information is consistent with the pre-saved access-prohibited website domain name information, DNS server 320 communicates to the terminal a warning page IP address or another alert indicating the potential that the requested domain corresponds to, or is otherwise associated with, a malicious party. In some embodiments, if the domain name information is not consistent with the pre-saved access-prohibited website domain name information, DNS server 320 sends to the terminal the web page address corresponding to the domain name information. At step 4 of FIG. 3, in response to receiving the web page address from DNS server 320, terminal 310 generates a web page request. For example, the network layer of terminal 310 generates the web page request based at least in part on the web page address received from DNS server 320. Terminal 310 (e.g., the network layer of terminal 310) communicates the web page request to a remote application server 330. At 5 of FIG. 3, in response to receiving the web page request, remote application server 330 can generate a web page result corresponding to the web page request. Remote application server 330 generates the web page result based at least in part on the web page request. In addition, in response to receiving the web page request, remote application server 330 communicates the web page result corresponding to the web page request to terminal 310.

Figure 4:
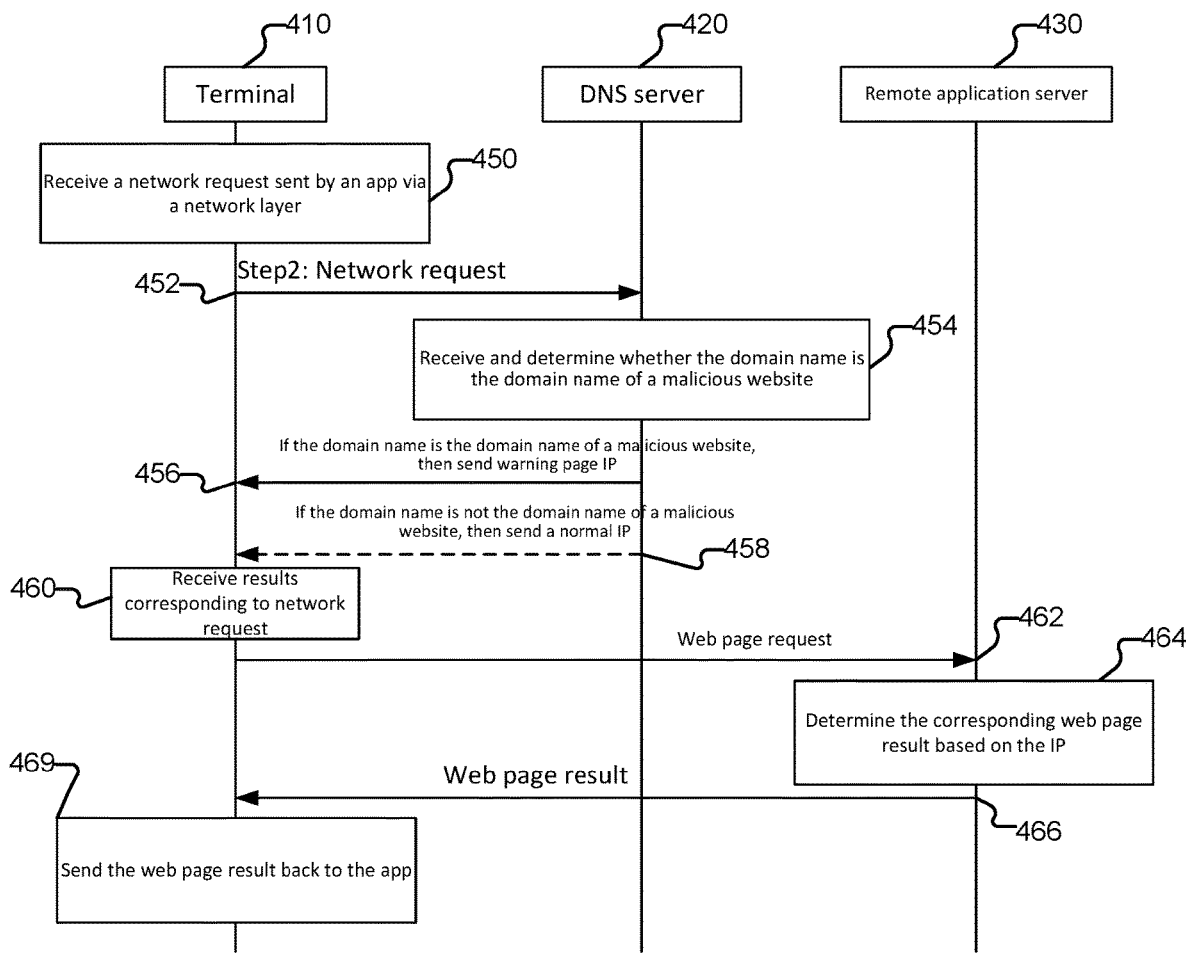
FIG. 4 is a diagram of a system for intercepting malicious websites according to various embodiments of the present application.

FIG. 4 is a diagram of a system for intercepting malicious websites according to various embodiments of the present application.

Referring to FIG. 4, system 400 for intercepting malicious websites is provided. System 300 can implement at least part of process 500 of FIG. 5, process 600 of FIG. 6, and/or process 700 of FIG. 7. System 400 can implement computer system 800 of FIG. 8. In some embodiments, system 400 is implemented in connection with system 200 of FIG. 2, and/or system 300 of FIG. 3.

System comprises terminal 410, DNS server 420, and remote application server 430.

At 450, a network request is received. An application running on terminal 410 can generate a network request. The network request can be communicated from the application to a network layer of terminal 410. For example, the application running on terminal 410 calls an interface in the terminal system network layer to send a network request. The application can generate and communicate the network request in response to a user input or another event occurring on terminal 410 or the application running thereon. For example, a user can input a selection to navigate to, or access, a network resource (e.g., a web page).

At 452, a network request is communicated. In response to receiving the network request from an application running on terminal 410, the network request can be communicated. For example, terminal 410 communicates the network request to DNS server 420. In some embodiments, in response to receiving the network request, the terminal system network layer first uses a DNS service to send the domain name of the network request to a secure DNS server (e.g., DNS server 420).

At 454, the network request is obtained. DNS server 420 can receive the network request communicated by terminal 410. In response to receiving the network request, DNS server 420 obtains a domain name corresponding to the network request. For example, DNS server 420 extracts the domain name from the network request. DNS server 420 can analyze the domain name corresponding to the network request, and determine a response based at least in part on the domain name corresponding to the network request. In some embodiments, DNS server 420 determines whether the domain name corresponds to, or is otherwise associated with, a malicious website or malicious third party.

If DNS server 420 determines that the requested domain name (e.g., the domain name corresponding to the network request) is of a malicious website, at 456, DNS server 420 communicates an IP containing a warning page or another alert indicating that the requested domain name is potentially malicious.

If DNS server 420 determines that the requested domain name is not a malicious domain name or is not associated with a malicious third party, at 458, DNS server 420 communicates an IP in a normal manner. For example, in response to determining that the requested domain name is not a malicious domain name, DNS server 420 communicates an address (e.g., an IP address) corresponding to the requested domain name to terminal 410.

For example, DNS server 420 can query a mapping of domain name information to access-prohibited website domains. The mapping of domain name information to access-prohibited website domains can indicate access restriction information (e.g., whether access is prohibited) for corresponding domains associated with the domain name information. In some embodiments, the mapping of domain name information to access-prohibited website domains is a black-list or a white list of domains. The determining of whether the domain name information corresponds to an access-prohibited website domain name information can include DNS server 420 searching the mapping of domain name information to access-prohibited website domains, and determining whether the domain name information corresponds to an access-prohibited website domain name information according to a result of the searching of the mapping of domain name information to access-prohibited website domains. As an example, if the domain name information is the same as (e.g., consistent with) the pre-saved access-prohibited website domain name information (e.g., if DNS server 420 finds pre-saved access-prohibited website domain name information corresponding to the domain name information obtained from the network request), DNS server 420 communicates to the terminal 410 a warning page IP address (e.g., alerting a user of terminal 410 of the potential that the requested domain is not secure). As another example, if the domain name information is different from the pre-saved access-prohibited website domain name information (e.g., if DNS server 420 does not find pre-saved access-prohibited website domain name information corresponding to the domain name information obtained from the network request), DNS server 420 communicates to the terminal 410 the web page address corresponding to the domain name information.

Because the secure DNS server (e.g., DNS server 420) is self-defined, the secure DNS server communicates a warning page IP if a request includes a malicious website domain name, regardless of the terminal application and of the application request the terminal makes. If the request does not include a domain that is not a malicious domain name, the secure DNS server will communicate the website IP corresponding to the network request. By making use of DNS server filtering, various embodiments avoid the cumbersome VPN access process. Accordingly, various embodiments reduce response time, improves access efficiency, and assures security of terminal access to pertinent domain names.

At 460, a result corresponding to the network request is obtained. Terminal 410 receives a result corresponding to the network from DNS server 420. As an example, if DNS server 420 determines that the requested domain name (e.g., the domain name corresponding to the network request) is of a malicious website, terminal 410 obtains an IP containing a warning page or another alert indicating that the requested domain name is potentially malicious. As another example, if the request does not include a domain that is not a malicious domain name, terminal 410 obtains an address (e.g., an IP address) corresponding to the requested domain name. In some embodiments, network layer of terminal 410 receives the results corresponding to the network request returned by DNS server 420 (e.g., the IP returned by the secure DNS server). Network layer of terminal 410 communicates information to an application layer of the terminal 410 (e.g., to an application running on terminal 410). The information communicated to the application layer is associated with the results corresponding to the network request.

At 462, a request is communicated. Terminal 410 can communicate a request associated with the results corresponding to the network request. For example, terminal 410 can communicate the request to remote application server 430. In response to receiving the results corresponding to the network request (e.g., an IP address corresponding to a domain), terminal 410 sends an access request or a web page request to remote application server 430. The network layer of terminal 410 can send the access request or the web page request to remote application server 430. Remote application server 430 obtains the request (e.g., access request or a web page request).

At 464, the request is processed. For example, in response to receiving the access request or the web page request, remote application server 430 processes the access request or the web page request. Remote application server 430 can determine information that is responsive to the access request or the web page request. For example, the remote application server 430 can determine results to the access request or the web page request. The results to the access request or the web page request can comprise web page information associated with the domain corresponding to the access request or the web page request.

At 466, a web page result is communicated. In response to determining the results to the access request or the web page request, remote application server 430 can communicate the results. The results can comprise web page information associated with the domain corresponding to the access request or the web page request. Remote application server 430 communicates the web page result to terminal 410 (e.g., in response to the web page request obtained from terminal 410).

At 410, a web page result is obtained. Terminal 410 can receive the web page result from remote application server 430. In some embodiments, a network layer of terminal 410 receives the web page result. In response to receiving the web page result, the network layer of terminal 410 can communicate at least part of the web page result to an application layer of terminal 410. For example, the network layer communicates the web page result to an application running on terminal 410. As an example, in response to receiving the web page result, the application can display a web page corresponding to the web page result. As another example, in response to receiving the web page result, the application can display information based on the web page result. As an example, in response to receiving the web page result, the application can perform one or more functions based at least in part on the web page result.

Figure 5:
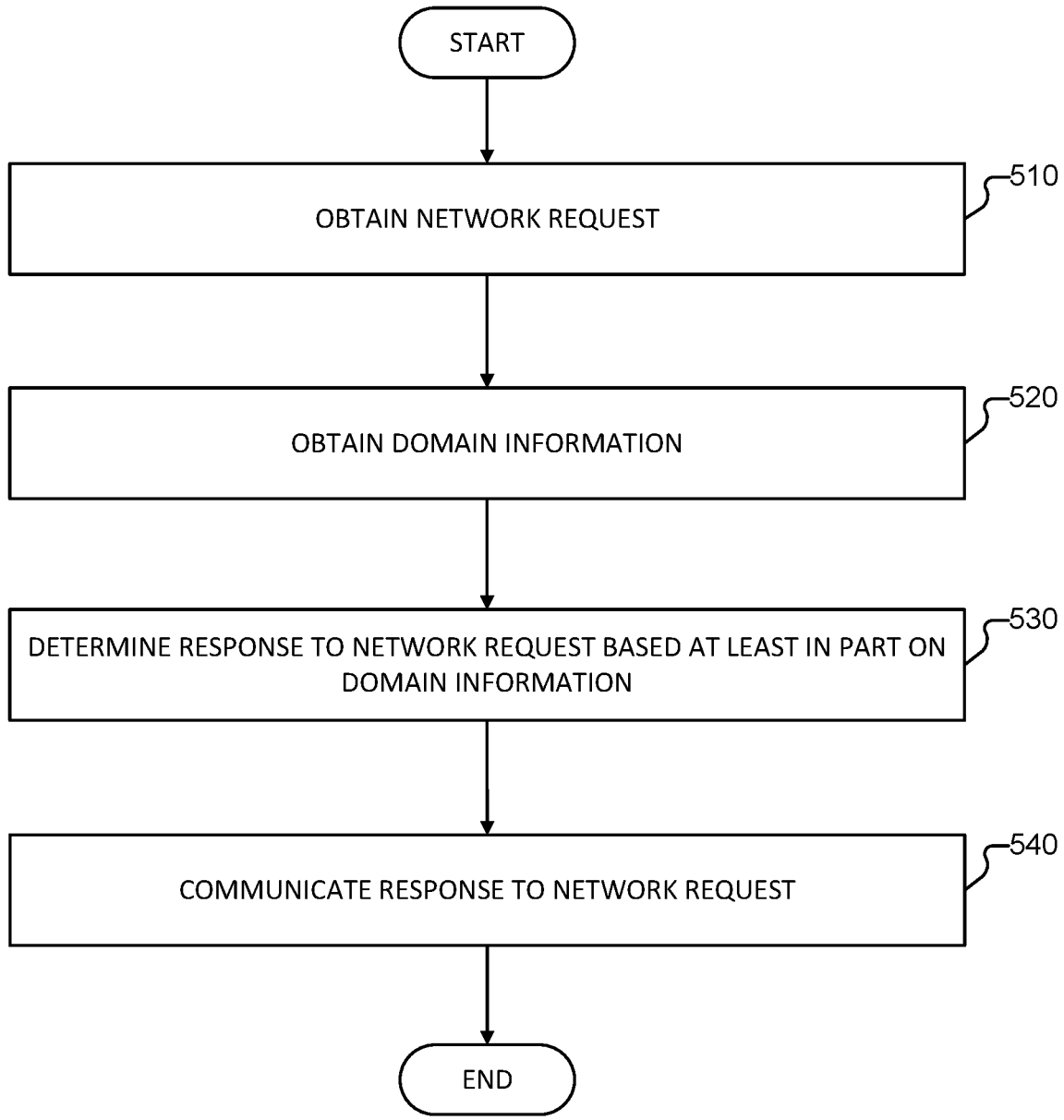
FIG. 5 is a flowchart of a method for intercepting malicious websites according to various embodiments of the present application.

FIG. 5 is a flowchart of a method for intercepting malicious websites according to various embodiments of the present application.

Referring to FIG. 5, process 500 for intercepting malicious websites is provided. Process 500 can be implemented in connection with process 600 of FIG. 6, and/or process 700 of FIG. 7. Process 500 can be implemented at least in part by computer system 800 of FIG. 8. In some embodiments, process 500 is implemented in connection with system 200 of FIG. 2, system 300 of FIG. 3 and/or system 400 of FIG. 4.

In some embodiments, process 500 is implemented by a DNS server.

At 510, a network request is obtained. DNS server can receive the network request via a network. For example, DNS server can receive the network request from a terminal. The network request can comprise a domain name corresponding to a domain that the terminal is attempting to, or wants to, access. A network layer of the terminal can send the network request to the DNS server. As an example, an application layer (e.g., of an application running on the terminal) of the terminal makes a call to the network layer to send a network request to the DNS server.

The DNS server stores (or has access to) domain names of malicious websites in order to detect whether a domain name in a network request sent by a terminal is a malicious website. For The DNS server can periodically or continually update the domain names corresponding to malicious websites. For example, in response to a malicious website being identified, the domain names corresponding to the malicious web sites can be updated to include the domain associated with the identified malicious website.

A mapping of domain name information to access-prohibited website domains is stored. For example, the mapping of domain name information to access-prohibited website domains is stored locally at the DNS server, or at a remote storage location that is accessible to (e.g., via one or more networks) the DNS server.

The mapping of domain name information to access-prohibited website domains can indicate access restriction information (e.g., whether access is prohibited) for corresponding domains associated with the domain name information. In some embodiments, the mapping of domain name information to access-prohibited website domains is a black-list or a white list of domains.

At 520, a domain information is obtained. The domain information can comprise domain name information. In some embodiments, the domain name information comprises information associated with a domain name. In some embodiments, the domain name information is obtained from the network request. For example, DNS server extracts the domain name information from the network request. The domain name information can comprise a domain name.

At 530, a response to the network request is determined. The response to the network request can be determined based at least in part on the domain name information. In response to receiving the network request, the DNS server can obtain the domain name information and determine a corresponding response. The response to the network request can be based at least in part on whether the domain name information (e.g., the domain name) corresponds to a malicious website (or is otherwise associated with a malicious party). For example, the domain name information (e.g., the domain name) can be searched in databases associated with malicious websites or malicious parties.

In some embodiments, the DNS server queries the mapping of domain name information to access-prohibited website domains. The mapping of domain name information to access-prohibited website domains can indicate access restriction information (e.g., whether access is prohibited) for corresponding domains associated with the domain name information. In some embodiments, the mapping of domain name information to access-prohibited web site domains is a black-list or a white list of domains. The determining of whether the domain name information corresponds to an access-prohibited website domain name information can include the DNS server searching the mapping of domain name information to access-prohibited website domains, and determining whether the domain name information corresponds to an access-prohibited website domain name information according to a result of the searching of the mapping of domain name information to access-prohibited website domains.

In some embodiments, in response to determining that the domain name information is consistent with (e.g., matches) the pre-saved access-prohibited website domain name information (e.g., if the DNS server finds pre-saved access-prohibited website domain name information corresponding to the domain name information obtained from the network request), the DNS server determines the response to the network request to be a warning page IP address (e.g., alerting a user of terminal of the potential that the requested domain is not secure), or another alert indicating the potential that the domain is associated with a malicious website or malicious third party.

In some embodiments, in response to determining that the domain name is not consistent with (e.g., does not match, or is different from) the pre-saved access-prohibited website domain name information (e.g., if the DNS server does not find pre-saved access-prohibited website domain name information corresponding to the domain name information obtained from the network request), the DNS server determines the response to the network request to be the web page address corresponding to the domain name or web page information corresponding to the domain name.

In response to receiving the network request, the DNS server obtains domain name information from within the network request. The domain name information can correspond to a domain name.

In some embodiments, the domain name information comprises a Uniform Resource Locator (URL) address of the website that the terminal is wanting (or requesting) to access. Various embodiments include implementing a method for intercepting malicious websites. No restrictions are imposed as to specifics of the method for intercepting malicious web sites.

In some embodiments, determining a response to the network request based at least on the domain name information includes the DNS server determining whether the domain name information is consistent with (e.g., the same as) pre-saved access-prohibited website domain information. In connection with determining whether the domain name information is consistent with (e.g., the same as) pre-saved access-prohibited website domain information, the DNS server can determine whether the to-be-accessed website corresponding to the domain name information is an access-prohibited website.

According to various embodiments, access-prohibited websites include: phishing websites, pornographic websites, gambling websites, websites that spread rumors, subvert the state, or affect social stability, and other websites that violate applicable laws and regulations (e.g., U.S. laws, Chinese law, etc.).

In some embodiments, determining a response to the network request based at least in part on the domain name information includes the DNS server determining whether a domain name corresponding to a network request is malicious based on mappings of domain names to access-prohibited website domains or mappings of domain names to domain name access information that otherwise indicates access restriction information (e.g., a white list, a black list, etc.).

At 540, the response to the network request is communicated. The DNS server communicates the response corresponding to the network request to the terminal. In response to determining the response to the network request (e.g., based at least in part on the domain name information), the DNS server communicates the response to the terminal. In some embodiments, the response comprises an address of a network resource of web page corresponding to the network request. For example, the response comprises an IP address of a web page or a network resource. In some embodiments, the response comprises an IP address of a web page or a network resource associated with the domain corresponding to the domain name information comprised in the network request. In some embodiments, the response comprises an IP address of a web page or a network resource different from the domain associated with the domain name information comprised in the network request. As an example, the web page or a network resource different from the domain comprised in the network request can correspond to an alert or warning that the domain associated with the domain name information comprised in the network request is potentially malicious (e.g., corresponds to, or is associated with, a malicious webpage or a malicious third party).

In some embodiments, if the domain name information is consistent with the pre-saved access-prohibited website domain name information, the server communicates to the terminal a warning page IP address or another alert indicating the potential that the requested domain corresponds to, or is otherwise associated with, a malicious party.

In some embodiments, if the domain name information is not consistent with the pre-saved access-prohibited website domain name information, the server sends to the terminal the web page address corresponding to the domain name information.

According to various embodiments, if, based on the determining the response to the network request, the network request sent by the terminal is determined to correspond to a request to access a prohibited-access website, a first operation is executed; and if, based on the determining the response to the network request, the network request sent by the terminal is determined to correspond to a request to access a legitimate website, a second operation is executed.

In some embodiments, directly acquiring a malicious website by omitting VPN signaling requests comprises: receiving a network request sent by a terminal, analyzing the network request, obtaining the domain name information from the network request, determining whether the domain name information is consistent with (e.g., matches, or the same as) pre-saved access-prohibited website domain name information, and returning to the terminal a corresponding web page response message based on the determining whether the domain name information is consistent with (e.g., matches, or the same as) pre-saved access-prohibited website domain name information. Accordingly, system resource consumption is reduced, and the large expenditure of system resources resulting from the requirement in the related art that all malicious website interception be completed by a VPN can be avoided.

In some embodiments, if the network request comprises a domain name request, the obtaining of the network request comprises obtaining a domain name request sent by the terminal. If the network request comprises a domain name request, the DNS server operates to analyze website domain names comprised in the domain name request to determine whether website domain names comprised in the domain name request correspond to, or are otherwise associated with, malicious websites. If a network request sent by a terminal comprises a domain name (e.g., to be accessed by an application in the terminal), the DNS server receives the domain name request sent by the terminal, and obtains the corresponding domain name comprised in the domain name request.

In some embodiments, determining a response to the network request comprises, if the domain name information comprises a domain name, obtaining a pre-saved domain name information set of access-prohibited websites. In some embodiments, the determining the response to the network request comprises determines whether the domain name information corresponds to an access-prohibited website domain name information. For example, determining the response to the network request comprises the server querying a mapping of domain name information to access-prohibited website domains. The mapping of domain name information to access-prohibited website domains can indicate access restriction information (e.g., whether access is prohibited) for corresponding domains associated with the domain name information. In some embodiments, the mapping of domain name information to access-prohibited website domains is a black list or a white list of domains. The determining the response to the network request comprises can comprise the server searching the mapping of domain name information to access-prohibited website domains, and determining whether the domain name information corresponds to an access-prohibited website domain name information according to a result of the searching of the mapping of domain name information to access-prohibited website domains.

In some embodiments, after the DNS server analyzes the network request on the basis of the domain name that is comprised in the network request, the DNS server obtains a domain name information set of predicted access-prohibited websites. The domain name information set can include names and domain names of access-prohibited addresses. Conversely, the domain name information set can include names and domain names of access-permitted addresses. The specifics of a domain name information set including names and domain names of access-prohibited addresses are as shown in Table 1. Table 1 is illustrates a domain name information set of pre-saved access-prohibited websites (e.g., multiple access-prohibited websites and domain name information corresponding to the access-prohibited websites). Table 1 is as follows:

TABLE 1

| Name of access-prohibited website | Domain name of access-prohibited website |
|---|---|
| Website 1 | Domain name 1 |
| Website 2 | Domain name 2 |
| Website 3 | Domain name 3 |
| ... | ... |
| Website N | Domain name N |

The domain name information in the domain name information set can be used as a basis to match the domain name (e.g., comprised in the network request). For example, the DNS server uses domain name information in the domain name information set as a basis to match the domain name in the network request sent by the terminal.

The DNS server can determine whether the domain name is the same as a domain name in the domain name information set.

In response to determining that the domain name information is the same as pre-saved access-prohibited website domain name information, an Internet Protocol (IP) address of a warning page can be communicated (e.g., by the server)

to the terminal. In response to determining that the domain name information is different from pre-saved access-prohibited website domain name information, a web page address corresponding to the domain name information can be communicated (e.g., by the server) to the terminal.

According to various embodiments, the DNS server, in order to implement detection and interception of malicious websites, stores malicious website information. As an example, the malicious website information comprises all websites known to be malicious. As an example, the malicious website information comprises all websites at least suspected to be malicious. The malicious website information can be updated (e.g., in response to determining a new malicious website, periodically, etc.). The malicious website information comprises domain name information. In response to determining that the domain name comprised in a network request sent by a terminal is the same as pre-saved malicious website domain name information, the IP address of a warning page is sent to the terminal. The sending a warning page to the terminal can comprise sending a warning page IP to the terminal. In response to determining that the domain name comprised in a network request sent by a terminal is different from pre-saved malicious website domain name information, the website being accessed by the application in the terminal is determined to be a legitimate website, and the web page address corresponding to the domain name information is sent to the terminal.

In some embodiments, the sending of an Internet Protocol (IP) address of a warning page to the terminal comprises extracting (or obtaining) the Internet Protocol (IP) address of the warning page corresponding to the domain name.

The warning page IP address corresponding to the domain name can be stored in advance of the network request being obtained. For example, the DNS server can store warning page IP addresses for websites deemed to be (or suspected to be) malicious. In some embodiments, a warning page is uniformly allocated for situations where the domain name is an access-prohibited website domain name, and the IP address of the warning page is sent to the terminal. In some embodiments, different warning pages are allocated according to different domain names, and each warning page type is generated in classified form. For example, each warning type is allocated its corresponding warning page, and different types of warning page IP addresses are sent to the terminal. The warning pages corresponding to the different domain names can be based on a level of maliciousness or a measure or value associated with an insecurity level of the corresponding domain.

In some embodiments, the sending of an Internet Protocol (IP) address of a warning page to the terminal comprises sending the IP address via a package to the terminal. The IP address of the warning page (or the warning page at the corresponding IP address) can instruct (e.g., inform or warn) that the web page of the terminal-domain name pair involves access risk or is classed as illegal access. The warning page corresponding to the IP address can provide information relating to the lack of security or maliciousness of the domain associated with the domain name information comprised in the network request.

Figure 6:
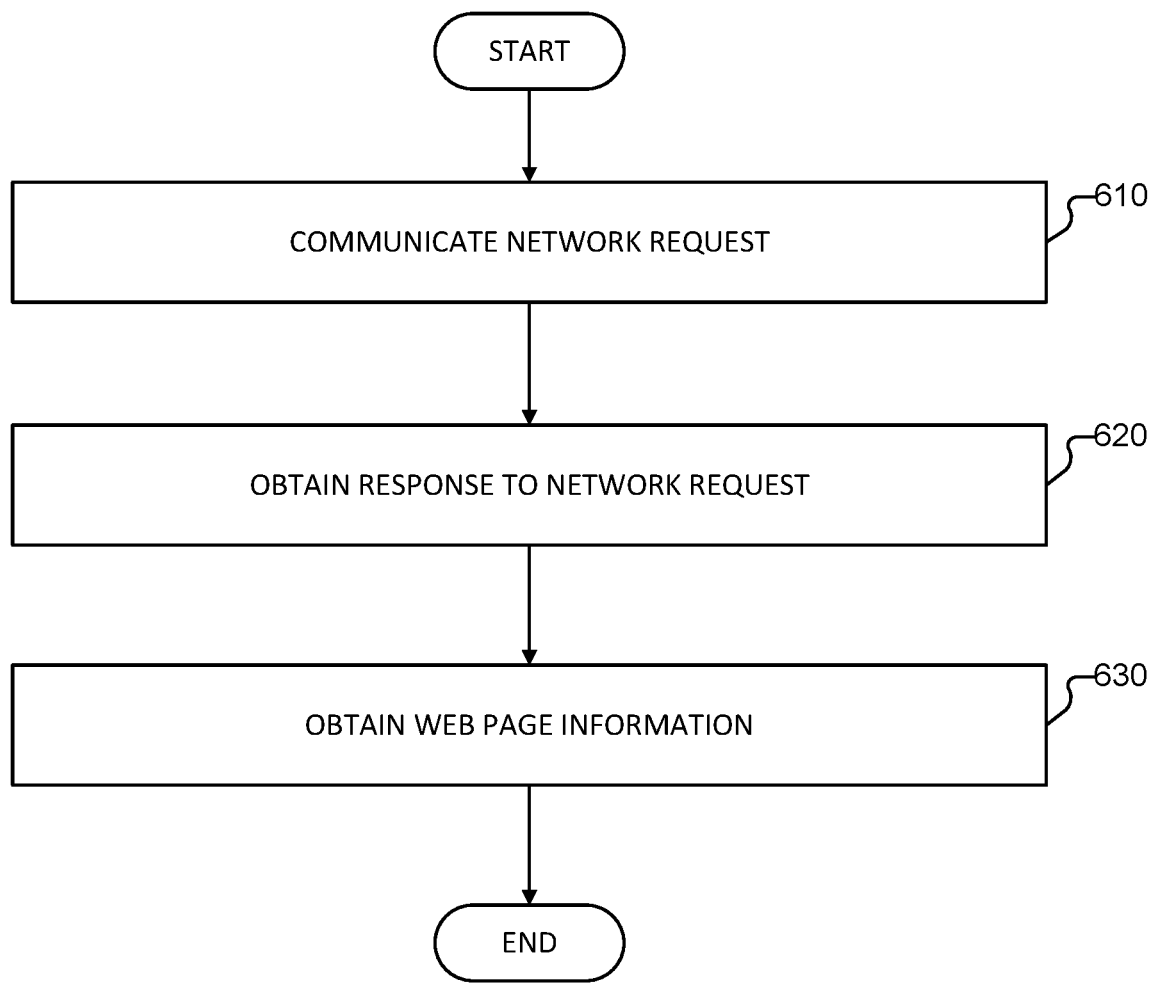
FIG. 6 is a flowchart of a method for intercepting malicious websites according to various embodiments of the present application.

FIG. 6 is a flowchart of a method for intercepting malicious websites according to various embodiments of the present application.

Referring to FIG. 6, process 600 for intercepting malicious websites is provided. Process 600 can be implemented in connection with process 500 of FIG. 5, and/or process 700 of FIG. 7. Process 600 can be implemented at least in part by computer system 800 of FIG. 8. In some embodiments, process 600 is implemented in connection with system 200 of FIG. 2, system 300 of FIG. 3 and/or system 400 of FIG. 4.

In some embodiments, process 500 is implemented by a terminal. As an example, process 600 can be invoked by a user of the terminal requesting access to a web page. As another example, process 600 can be invoked in response to selection (e.g., by a user) of a link provided by an application (or by the terminal). As another example, process 600 can be invoked in response to execution of an application running on a terminal. Process 600 can be invoked according to, or in response to, other contexts.

At 610, a network request is communicated. A terminal can generate a network request and communicate the network request to a server (e.g., a DNS server). The network request comprises information associated with a web page or network resource that the terminal wishes to access. For example, the network request comprises domain information. The domain information can comprise domain name information. In some embodiments, the domain name information comprises information associated with a domain name. The domain name information can comprise a domain name.

As an example, the network request can be generated in response to a user of the terminal requesting access to a web page. As another example, the network request can be generated in response to selection (e.g., by a user) of a link provided by an application (or by the terminal). As another example, the network request can be generated in response to execution of an application running on a terminal. The network request can be generated according to, or in response to, other contexts.

A network layer of the terminal can send the network request to the DNS server. As an example, an application layer (e.g., of an application running on the terminal) of the terminal makes a call to the network layer to send a network request to the DNS server.

In some embodiments, the terminal has virtual private network connect-on-demand (VPN On Demand) configurable functions. For example, the terminal run an iOS operating system. In some embodiments, the conditions according to which the use of the VPN is invoke are preconfigured according to these functions. For example, the conditions in response to which the terminal connects to the VPN (or accesses a web page or other network resource via the VPN) are stored in advance.

At 620, a response to the network request is obtained. The terminal can receive the response to the network request from the server (e.g., the DNS server). In some embodiments, the response to the network request is generated based at least in part on a determination of whether the domain associated with the network request is malicious or identified as malicious.

The DNS server stores (or has access to) domain names of malicious websites in order to detect whether a domain name in a network request sent by a terminal is a malicious website. For The DNS server can periodically or continually update the domain names corresponding to malicious websites. For example, in response to a malicious website being identified, the domain names corresponding to the malicious web sites can be updated to include the domain associated with the identified malicious website.

The response to the network request can be determined based at least in part on the domain name information. In response to receiving the network request, the DNS server can obtain the domain name information and determine a corresponding response. The response to the network request can be based at least in part on whether the domain name information (e.g., the domain name) corresponds to a malicious website (or is otherwise associated with a malicious party). For example, the domain name information (e.g., the domain name) can be searched in databases associated with malicious websites or malicious parties.

In response to determining the response to the network request (e.g., based at least in part on the domain name information), the DNS server communicates the response to the terminal. In some embodiments, the response comprises an address of a network resource of web page corresponding to the network request. For example, the response comprises an IP address of a web page or a network resource. In some embodiments, the response comprises an IP address of a web page or a network resource associated with the domain corresponding to the domain name information comprised in the network request. In some embodiments, the response comprises an IP address of a web page or a network resource different from the domain associated with the domain name information comprised in the network request. As an example, the web page or a network resource different from the domain comprised in the network request can correspond to an alert or warning that the domain associated with the domain name information comprised in the network request is potentially malicious (e.g., corresponds to, or is associated with, a malicious webpage or a malicious third party).

As an example, in response to the terminal sending a network request to the server, the server determines, based on the network request, a web page response message corresponding to the terminal.

For example, in the case of a network request that corresponds to a domain name request, the application in the terminal forwards the domain name request via the network layer to the DNS server, which compares the domain name that is comprised in the network request and corresponds to the website that the application is waiting to access to a pre-saved access-prohibited website domain name. If the domain name that is comprised in the network request is the same a pre-saved access-prohibited website domain name (e.g., if the domain corresponding to the network request is comprised in mapping of domain name information to access-prohibited website domains), the terminal receives the warning web page IP sent by the DNS server. In some cases, the terminal receives from the DNS server an IP address associated with a warning web page, and the terminal thereafter access the warning web page corresponding to the IP address communicated by the DNS server. If the domain name that is comprised in the network request is different from a pre-saved access-prohibited website domain name (e.g., if the domain corresponding to the network request is not comprised in mapping of domain name information to access-prohibited website domains), the terminal receives from the DNS server the IP address corresponding to domain name.

According to various embodiments, directly acquiring a malicious website by omitting VPN signaling requests comprises sending a network request to a server and receiving back from the server a web page response message based on the network request. System resource consumption can be reduced, and thus the technical problem associated with the large expenditure of system resources resulting from the requirement in the related art that all malicious website interception be completed by a VPN is solved.

In some embodiments, the communicating of the network request comprises obtaining an application program-to-network layer network request, and sending the network request to the server. The network request comprises: a domain name or other domain information.

The terminal can obtain an application program (app)-to-network layer network request. For example, in the terminal system, a network request for the website that the application is wanting to access is obtained through the network layer. The network request comprises a domain name or other domain information, and the terminal sends the network request via an interface of the network layer to the DNS server.

In some embodiments, the obtaining of a response to the network request (e.g., a web page response message) sent the server according to the network request comprises in response to the server determining that the domain name information included in the network request is the same as pre-saved access-prohibited website domain name information, receive a warning page IP address, and in response to the server determining that the domain name information in the network request is different from pre-saved access-prohibited website domain name information, receiving from the server the web page address corresponding to the domain name information in the network request.

The DNS server can detect and analyzes domain names according to network requests sent by the terminal and thereby detects and intercepts malicious web sites. If the domain name (or other domain information) in the network request communicated by the terminal corresponds to an access-prohibited website domain (or domain name), the terminal receives a warning page sent by the DNS server. The sending the warning page comprises: sending the IP address corresponding to the warning page. If the domain name (or other domain information) in the network request communicated by the terminal does not correspond to an access-prohibited web site domain name, the terminal receives from the DNS server the IP address of the corresponding domain name.

At 630, web page information is obtained. For example, a web page request is communicated and web page information is obtained in response to the web page request. In some embodiments, the terminal can generate the web page request based at least in part on the response to the network request that the terminal received. The terminal can communicate the web page request to a remote application server. In response to receiving the web page request, the remote application server can generate (or obtain) web page information and provide the web page information to the terminal.

630 of process 600 can be excluded in some embodiments. For example, in response to receiving a response to the network request wherein the response comprises information that is indicative of the domain associated with the network request being malicious, the terminal can exclude attempting a web page request in connection with the domain of the network request.

In some embodiments, in response to obtaining the response to the network request (e.g., in response to receiving the web page response message sent back by the server according to the network request), the response to the network request (e.g., the web page response message) is used as a basis to send a web page request message to a remote application server. The obtaining the web page information can include receiving a web page result (e.g., the web page information) sent back by the remote application server. In response to receiving the web page result from the remote application server, a network layer of the terminal can provide the web page result to the application.

For example, the network layer provides the web page result to the application from which the network request originated.

In some embodiments, after the terminal receives the web page response message sent by the DNS server (e.g., carrying the web page-corresponding IP address sent by the DNS server), the terminal uses the IP address as a basis to send a web page request message to a remote application server. The terminal can send a web page request message via the network layer to the remote application server and can receive a web page result back from the remote application server. In response to receiving the web page result, the terminal sends the web page result through the network layer back to the application.

Figure 7:
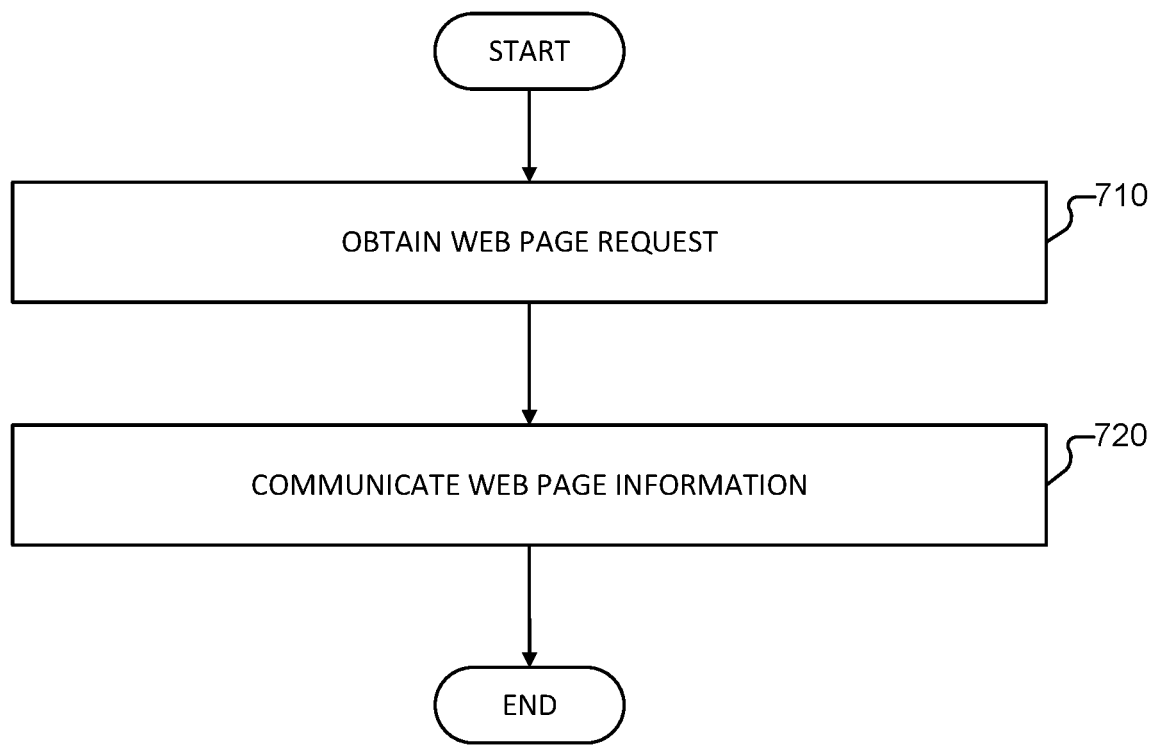
FIG. 7 is a flowchart of a method for intercepting malicious websites according to various embodiments of the present application.

FIG. 7 is a flowchart of a method for intercepting malicious websites according to various embodiments of the present application.

Referring to FIG. 7, process 700 for intercepting malicious websites is provided. Process 700 can be implemented in connection with process 500 of FIG. 5, and/or process 600 of FIG. 6. Process 700 can be implemented at least in part by computer system 800 of FIG. 8. In some embodiments, process 700 is implemented in connection with system 200 of FIG. 2, system 300 of FIG. 3 and/or system 400 of FIG. 4.

In some embodiments, process 700 is implemented by a server. For example, 700 is implemented by a remote application server. The remote application server can provide web page information to a terminal, or provide one or more services to the terminal.

At 710, a web page request is obtained. The web page request can be sent by the terminal. The server (e.g., the remote application server) can receive the web page request message sent by a terminal. The web page request can comprise an IP address of a web page or network resource that is being requested by the terminal (e.g., that the terminal wants to access).

At 720, web page information is communicated. In response to receiving the web page request, web information is sent to the terminal. For example, the server (e.g., the remote application server) can determine a response to the web page request based at least in part on the IP address of a web page or network resource comprised in the web page request. The response to the web page request can comprise web page information (e.g., a web page result corresponding to the web page request message). The web page information can comprise information from which the terminal can generate or display a web page.

In some embodiments, the DNS server analyzes the to-be-accessed domain name in the network request sent by the terminal. In response to the domain name in the network request sent by the terminal being analyzed and determined to not correspond to an access-prohibited website, the DNS server sends the web page IP corresponding to the domain name (or to domain information comprised in the network request) to the terminal. In response to receiving the web page IP corresponding to the domain associated with the network request, the terminal sends a web page request message to the remote application server. The remote application server uses the web page request message as a basis to provide the corresponding web page result to the terminal. The sending of a web page request message to the remote application server can comprise receiving on the terminal network side the domain name-corresponding web page IP address sent back by the DNS server, and using this web page IP address as the basis for sending the web page IP address through the application layer to the corresponding remote application server. The remote application server uses the web page IP address to obtain the corresponding web page, and sends the corresponding web page to the terminal. The terminal then sends the web page back to the application program via the network layer.

According to various embodiments, directly acquiring a malicious website by omitting VPN signaling requests comprises sending a web page result corresponding to the web page request message back to the terminal. System resource consumption can be reduced, and the large expenditure of system resources resulting from the requirement in the related art that all malicious website interception be completed by a VPN can be avoided.

Figure 8:
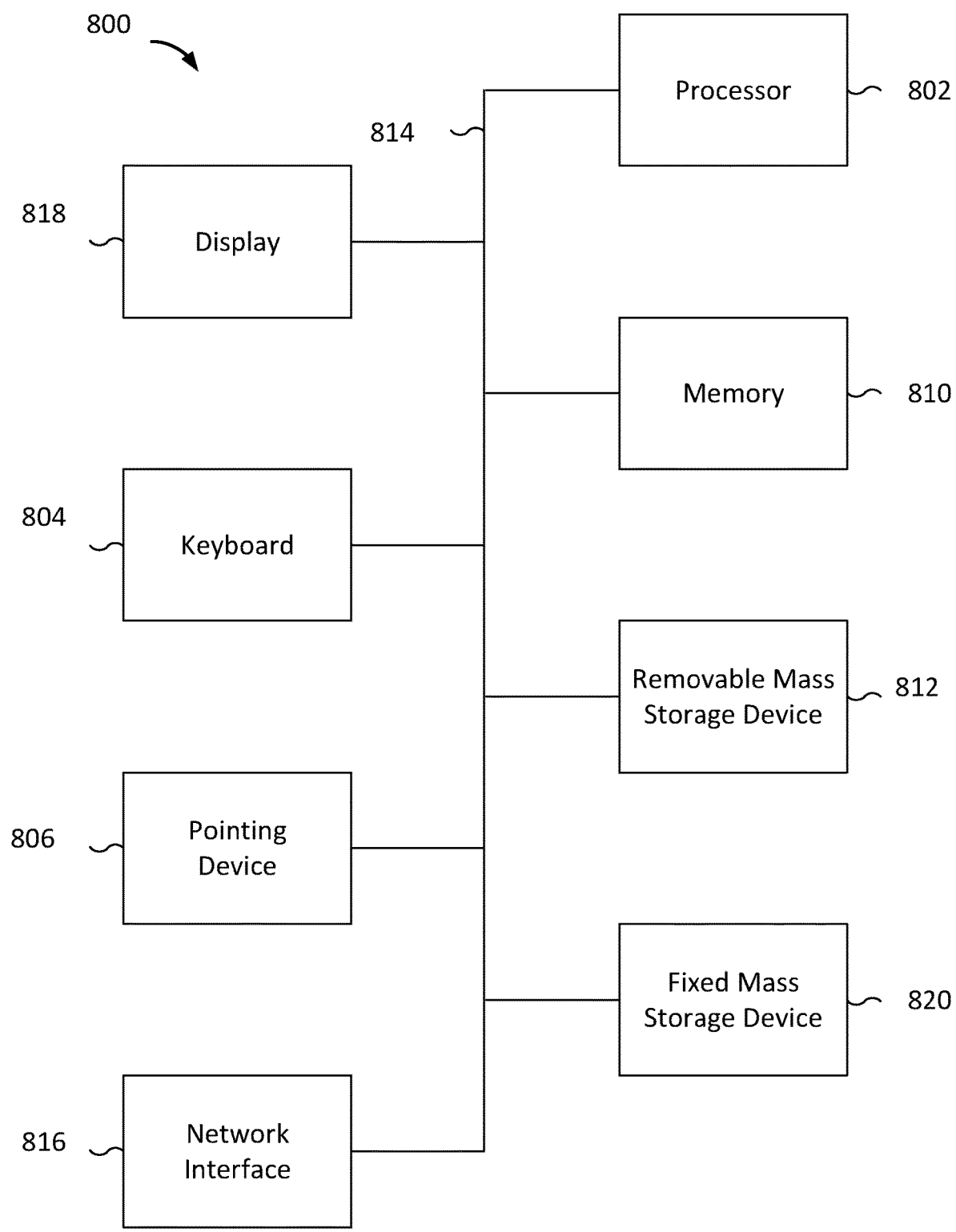
FIG. 8 is a functional diagram of a computer system for intercepting malicious websites according to various embodiments of the present disclosure.

FIG. 8 is a functional diagram of a computer system for intercepting malicious websites according to various embodiments of the present disclosure.

Referring to FIG. 8, system 800 for intercepting malicious websites is provided. System 800 can implement at least part of process 500 of FIG. 5, process 600 of FIG. 6, and/or process 700 of FIG. 7. System 800 can be implement at least in part by computer system 200 of FIG. 2. In some embodiments, system 800 is implemented in connection with system 300 of FIG. 3 and/or system 400 of FIG. 4.

Computer system 800, which includes various subsystems as described below, includes at least one microprocessor subsystem (also referred to as a processor or a central processing unit (CPU)) 802. For example, processor 802 can be implemented by a single-chip processor or by multiple processors. In some embodiments, processor 802 is a general purpose digital processor that controls the operation of the computer system 800. Using instructions retrieved from memory 810, the processor 802 controls the reception and manipulation of input data, and the output and display of data on output devices (e.g., display 818).

Processor 802 is coupled bi-directionally with memory 810, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 802. Also as is well known in the art, primary storage typically includes basic operating instructions, program code, data, and objects used by the processor 802 to perform its functions (e.g., programmed instructions). For example, memory 810 can include any suitable computer-readable storage media, described below, depending on whether, for example, data access needs to be bi-directional or uni-directional. For example, processor 802 can also directly and very rapidly retrieve and store frequently needed data in a cache memory (not shown). The memory can be a non-transitory computer-readable storage medium.

A removable mass storage device 812 provides additional data storage capacity for the computer system 800, and is coupled either bi-directionally (read/write) or uni-directionally (read only) to processor 802. For example, storage 812 can also include computer-readable media such as magnetic tape, flash memory, PC-CARDS, portable mass storage devices, holographic storage devices, and other storage devices. A fixed mass storage 820 can also, for example, provide additional data storage capacity. The most common example of mass storage 820 is a hard disk drive. Mass storage device 812 and fixed mass storage 820 generally store additional programming instructions, data, and the like that typically are not in active use by the processor 802. It will be appreciated that the information retained within mass storage device 812 and fixed mass storage 820 can be incorporated, if needed, in standard fashion as part of memory 810 (e.g., RAM) as virtual memory.

In addition to providing processor 802 access to storage subsystems, bus 814 can also be used to provide access to other subsystems and devices. As shown, these can include a display monitor 818, a network interface 816, a keyboard 804, and a pointing device 806, as well as an auxiliary input/output device interface, a sound card, speakers, and other subsystems as needed. For example, the pointing device 806 can be a mouse, stylus, track ball, or tablet, and is useful for interacting with a graphical user interface.

The network interface 816 allows processor 802 to be coupled to another computer, computer network, or telecommunications network using a network connection as shown. For example, through the network interface 816, the processor 802 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 802 can be used to connect the computer system 800 to an external network and transfer data according to standard protocols. For example, various process embodiments disclosed herein can be executed on processor 802, or can be performed across a network such as the Internet, intranet networks, or local area networks, in conjunction with a remote processor that shares a portion of the processing. Additional mass storage devices (not shown) can also be connected to processor 802 through network interface 816.

An auxiliary I/O device interface (not shown) can be used in conjunction with computer system 800. The auxiliary I/O device interface can include general and customized interfaces that allow the processor 802 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 8 is but an example of a computer system suitable for use with the various embodiments disclosed herein. Other computer systems suitable for such use can include additional or fewer subsystems. In addition, bus 814 is illustrative of any interconnection scheme serving to link the subsystems. Other computer architectures having different configurations of subsystems can also be utilized.

It should be understood that the devices and methods that are disclosed in the several embodiments provided above can be realized in other ways. For example, the device embodiment described above is merely illustrative. For example, the delineation of units is merely a delineation according to local function. The delineation can take a different form during actual implementation.

Please understand that, in several embodiments provided by the present application, the disclosed technical content may be implemented in other ways. The means embodiments described above are merely illustrative. For example, the division into said units is merely a division by logical function. When actually implemented, there may be other forms of division. For example, multiple units or components may be combined or integrated into another system, or some features might be omitted or not executed. Also, couplings or direct couplings or communication connections between things that are displayed or discussed may be through some interfaces. Indirect couplings or communication connections between units or modules may be electrical or otherwise.

Units described as separate components may or may not be physically separate, and components displayed as units may or may not be physical units. They can be located in one place, or they can be distributed across multiple network units. The embodiment schemes of the present embodiments can be realized by selecting part or all of the units in accordance with actual need.

In addition, each functional unit in each of the embodiments of the present application may be integrated into a processing unit, or each unit may have an independent physical existence. Or two or more units may be integrated into one unit. The integrated units described above may be implemented in the form of hardware, or they may be implemented in the form of software functional units.

If the integrated units are implemented in the form of software functional units and are sold or used as independent products, they may be stored in computer-readable media. With such an understanding, it becomes clear that the technical schemes of the present application, whether intrinsically or those portions that contribute to the prior art, or all or part of the technical schemes, may be embodied in the form of software products. These computer software products are stored in a storage medium and comprise some instructions for causing a computer device (which could be a personal computer, a server, or a network device) to execute all or some of the steps in the methods described by the various embodiments of the present application. The storage medium described above encompasses: USB flash drives, read-only memory (ROM), random access memory (RAM), mobile hard drives, magnetic or optical disks, or various other media that can store program code.

The above are merely preferred embodiments of the present application. Please note that persons with ordinary skill in the art could also make certain improvements and embellishments and that these improvements and embellishments should also be regarded as being within the protective scope of the present application, so long as they do not depart from the principles of the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
communicating, by one or more processors of a terminal, a network request to a Domain Name Server (DNS server), wherein the network request comprises domain information;
obtaining, by the one or more processors of the terminal, a web page response from the DNS server, wherein the web page response is generated based at least in part on a determination of whether the domain information corresponds to an access-prohibited website domain;
in response to receiving from the DNS server an indication that the domain information corresponds to the access-prohibited website domain, invoking, by the one or more processors of the terminal, a command to communicate in a virtual private network connect-on-demand mode with a web page corresponding to the network request; and obtaining, by the one or more processors of the terminal, the web page corresponding to the network request via a virtual private network established according to the virtual private network connect-on-demand mode.

2. The method of claim 1, wherein the communicating the network request comprises:
   obtaining an application program-to-network layer network request; and
   sending the network request to the DNS server, wherein the domain information comprises a domain name.

3. The method of claim 1, wherein obtaining the web page response comprises:
   in response to the DNS server determining that the domain information comprised in the network request is consistent with information stored in a mapping of domain information to access-prohibited web site domains, receiving, from the DNS server, the IP address of the warning page; and
   in response to the DNS server determining that the domain information comprised in the network request is not consistent with information stored in the mapping of domain information to access-prohibited website domains, receiving, from the DNS server, the IP address corresponding to the domain information comprised in the network request.

4. The method of claim 3, wherein a web page corresponding to the IP address of the warning page provides an indication to a user that a domain corresponding to the domain information involves access risk or is classed as illegal access.

5. The method of claim 3, further comprising:
   obtaining, by the one or more processors of the terminal, a web page result from the remote application server; and
   sending, by the one or more processors of the terminal, the web page result via a network layer of a terminal back to an application program of the terminal.

6. The method of claim 5, wherein the network request was generated in connection with a request of the application program.

7. The method of claim 1, further comprising:
   configuring, by the one or more processors of the terminal, one or more conditions for invoking the private network connect-on-demand mode; and
   determining, by the one or more processors of the terminal, whether at least one of the one or more conditions for invoking the virtual private network connect-on-demand mode is satisfied;
   wherein:
      the virtual private network is invoked in response to a determination that the at least one of the one or more conditions for invoking the virtual private network connect-on-demand mode is satisfied; and
      the at least one of the one or more conditions comprises receiving the indication that the domain information corresponds to the access-prohibited website domain.

8. The method of claim 7, wherein the one or more conditions for invoking the virtual private network connect-on-demand mode comprises one or more of:
   access of at least one preset domain name;
   a network to which a terminal is connected switches to a preset WiFi network;
   failure of a preset network request; and
   an indication with respect to a preset domain, the indication being communicated from a designated server, and the designated server communicating the designation in response to at least one preset domain name being accessed.

9. The method of claim 1, further comprising:
configuring, by the one or more processors of the terminal, one or more conditions for invoking the virtual private network connect-on-demand mode, wherein the one or more conditions comprise one or more of:
   access of at least one preset domain name;
   a network to which a terminal is connected switches to a preset WiFi network;
   failure of a preset network request; and
   an indication with respect to a preset domain, the indication being communicated from a designated server, and the designated server communicating the designation in response to at least one preset domain name being accessed.

10. The method of claim 1, further comprising:
in response to receiving the web page response from the DNS server, communicating a web page request to a remote application server, wherein:
   the web page response comprises one of an Internet Protocol (IP) address corresponding to a warning page or an IP address corresponding to the domain information according to the determination of whether the domain information corresponds to the access-prohibited web site domain;
   the web page request comprises IP address information obtained from the web page response;
   in the event that the domain information is determined to correspond to the access-prohibited website domain, a web page provided based on the web page request corresponds to the warning page; and
   the warning page is different from a page provided at the IP address corresponding to the domain information.

11. A device, comprising:
one or more processors configured to:
   communicate a network request to a Domain Name Server (DNS server), wherein the network request comprises domain information;
   obtain a web page response message from the server, wherein the web page response is generated based at least in part on a determination of whether the domain information corresponds to an access-prohibited website domain;
      in response to receiving from the DNS server an indication that the domain information corresponds to the access-prohibited website domain invoke a command to communicate in a virtual private network connect-on-demand mode with a web page corresponding to the network request; and
      obtain the web page corresponding to the network request via a virtual private network established according to the virtual private network connect-on-demand mode; and
one or more memories coupled to the one or more processors, configured to provide the one or more processors with instructions.

12. A computer program product, the computer program product being embodied in a non-transitory computer readable storage medium and comprising computer instructions for:

communicating, by one or more processors of a terminal, a network request to a Domain Name Server (DNS server), wherein the network request comprises domain information;

obtaining a web page response message from the server, wherein the web page response is generated based at least in part on a determination of whether the domain information corresponds to an access-prohibited web site domain;

in response to receiving from the DNS server an indication that the domain information corresponds to the access-prohibited website domain, invoking, by the one or more processors of the terminal, a command to communicate in a virtual private network connect-on-demand mode with a web page corresponding to the network request; and obtaining, by the one or more processors of the terminal, the web page corresponding to the network request via a virtual private network established according to the virtual private network connect-on-demand mode.

13. A system for intercepting malicious websites, comprising:

a terminal, comprising:
one or more terminal processors configured to:
send a network request, wherein the network request comprises domain name information;
in response to receiving a web page response corresponding to the network request from a Domain Name Server (DNS server), communicating a web page request to a remote application server;
in response to receiving from the DNS server an indication that the domain information corresponds to the access-prohibited website domain, invoke a command to communicate in a virtual private network connect-on-demand mode with a web page corresponding to the network request; and
obtain the web page corresponding to the network request via a virtual private network established according to the virtual private network connect-on-demand mode; and
one or more terminal memories coupled to the one or more terminal processors, configured to provide the one or more terminal processors with instructions; and the DNS server, comprising:
one or more server processors, configured to:
receive the network request from the terminal;
obtain the domain name information from the network request;
determine whether the domain name information is matches pre-saved access-prohibited website domain name information;

in response to determining that the domain name information matches the pre-saved access-prohibited website domain name information, sending a Internet Protocol (IP) address corresponding to a warning page to the terminal, the indication that the domain information corresponds to the access-prohibited website domain, or both; and in response to determining that the domain name information is different from the pre-saved access-prohibited website domain name information, sending the an IP address corresponding to the domain information to the terminal; and one or more server memories coupled to the one or more server processors, configured to provide the one or more server processors with instructions.

14. The system of claim 13, wherein the terminal is configured to store one or more start conditions associated with the virtual private network connect-on-demand mode, the one or more start conditions comprising one or more of:
starting the virtual private network in response to determining that at least one preset domain name is accessed;
starting the virtual private network in response to determining that the network to which the terminal is connected switches to a preset WiFi network;
starting the virtual private network in response to determining that the network to which the terminal is connected switches to a mobile network;
starting the virtual private network in response to determining that a preset network request fails; and
starting the virtual private network in response to determining, upon at least one preset domain name being accessed, that a designated server is used to perform analysis and the analysis fails.

15. The system of claim 14, wherein the domain name information comprises a domain name.

16. The system of claim 13, further comprising:
a remote application server, comprising:
one or more remote application server processors, configured to:
receive a web page request sent by the terminal, the web page request comprising a web page address; and
determining a web page result based at least in part on the web page request; and
communicating the web page result to the terminal; and
one or more remote application server memories coupled to the one or more remote application server processors, and configured to provide the one or more remote application server processors with instructions.

17. The system of claim 13, wherein the web page address comprises an IP address.

* * * * *

UNITED STATES PATENT AND TRADEMARK OFFICE
CERTIFICATE OF CORRECTION

PATENT NO. : 10,846,398 B2  
APPLICATION NO. : 15/950671  
DATED : November 24, 2020  
INVENTOR(S) : Meichao Zhang and Zhijian Deng It is certified that error appears in the above-identified patent and that said Letters Patent is hereby corrected as shown below:

On the Title Page

Item (73), assignee, country, insert --(KY)--.

Signed and Sealed this
Twenty-second Day of June, 2021

Drew Hirshfeld
*Performing the Functions and Duties of the
Under Secretary of Commerce for Intellectual Property and
Director of the United States Patent and Trademark Office*